US012131181B2

(12) United States Patent
Bregman et al.

(10) Patent No.: US 12,131,181 B2
(45) Date of Patent: Oct. 29, 2024

(54) REMOVING SOFTWARE OPERATORS FROM DISTRIBUTED COMPUTING ENVIRONMENTS

(71) Applicant: Red Hat, Inc., Raleigh, NC (US)

(72) Inventors: Arie Bregman, Gan Yavne (IL); Steve Mattar, Herzliya (IL)

(73) Assignee: Red Hat, Inc., Raleigh, NC (US)

( * ) Notice: Subject to any disclaimer, the term of this patent is extended or adjusted under 35 U.S.C. 154(b) by 452 days.

(21) Appl. No.: 17/511,994

(22) Filed: Oct. 27, 2021

(65) Prior Publication Data

US 2023/0129217 A1 Apr. 27, 2023

(51) Int. Cl.
*G06F 9/48* (2006.01)
*G06F 9/455* (2018.01)
*G06F 9/50* (2006.01)
*G06F 9/54* (2006.01)

(52) U.S. Cl.
CPC .............. *G06F 9/485* (2013.01); *G06F 9/455* (2013.01); *G06F 9/45558* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5077* (2013.01); *G06F 9/5088* (2013.01); *G06F 9/54* (2013.01);
(Continued)

(58) Field of Classification Search
CPC ................ G06F 9/455; G06F 9/45558; G06F 2009/45562; G06F 2009/45575; G06F 2009/45591; G06F 9/48; G06F 9/4806; G06F 9/4843; G06F 9/485; G06F 9/4881; G06F 9/50; G06F 9/5077; G06F 9/5088; G06F 9/54
See application file for complete search history.

(56) References Cited

U.S. PATENT DOCUMENTS

| 9,389,980 | B2 | 7/2016 | Ferris et al. |
| 9,495,142 | B2 | 11/2016 | Koushik |
| 9,712,454 | B2 | 7/2017 | Tung et al. |

(Continued)

FOREIGN PATENT DOCUMENTS

CN 111984373 A 11/2020

OTHER PUBLICATIONS

Kress, J., et al., "Event-Driven SOA," Oracle, Dec. 2013, https://www.oracle.com/technetwork/articles/soa/ind-soa-events-2080401.html.

(Continued)

*Primary Examiner* — Charles M Swift
(74) *Attorney, Agent, or Firm* — Kilpatrick Townsend & Stockton LLP

(57) ABSTRACT

The removal of software operators can be managed according to some aspects described herein. In one example, a system can receive a command to remove an operator from a computing cluster and, in response, determine a set of actions previously performed in the computing cluster in relation to adding the operator to the computing cluster. Each action can involve the creation, modification, or deletion of at least one object in the computing cluster. The system can also determine a particular order in which the set of actions were previously performed relative to one another. The system can then assist with removing the operator from the computing cluster by causing an inverse of each action in the set of actions to be performed in the computing cluster in a reverse order to the particular order.

19 Claims, 7 Drawing Sheets

(52) U.S. Cl.
CPC ............. *G06F 2009/45562* (2013.01); *G06F 2009/45575* (2013.01); *G06F 2009/45591* (2013.01)

(56) References Cited

U.S. PATENT DOCUMENTS

| | | |
|---|---|---|
| 9,990,238 B2 | 6/2018 | Seago et al. |
| 10,949,232 B2 | 3/2021 | Bregman et al. |
| 2014/0173226 A1* | 6/2014 | Gold .................. G06F 3/06 711/159 |
| 2017/0060629 A1* | 3/2017 | Vora .................. G06F 9/542 |
| 2018/0114126 A1 | 4/2018 | Das et al. |
| 2019/0102257 A1 | 4/2019 | Zhou et al. |
| 2019/0377622 A1* | 12/2019 | Kurian ............... G06F 11/0775 |
| 2020/0097308 A1* | 3/2020 | Bregman ............ G06F 11/1484 |
| 2021/0044646 A1 | 2/2021 | Guim Bernat et al. |
| 2021/0103499 A1* | 4/2021 | Alluboyina ............ G06F 3/067 |
| 2021/0263779 A1 | 8/2021 | Haghighat et al. |
| 2022/0197670 A1* | 6/2022 | Lindholm ........... G06F 9/44505 |
| 2022/0318001 A1* | 10/2022 | Freeman ............ G06F 9/45558 |

OTHER PUBLICATIONS

Pallari, J., "Check your Kubernetes deployments!," Polar Squad, 2021, https://polarsquad.com/blog/check-your-kubernetes-deployments.

Phadake, "Get to the Root of Cloud Infrastructure Issues with Logs, Alerts and Events in Rovius 1.3.1," Accelerite Blog, Apr. 20, 2018, https://accelerite.com/blogs/cloud-infrastructure-logs-analysis-and-alerts/.

"AWS Cloud Trail," Amazon Web Services, Inc., 2018, https://aws.amazon.com/cloudtrail/.

* cited by examiner

REMOVING SOFTWARE OPERATORS FROM DISTRIBUTED COMPUTING ENVIRONMENTS

TECHNICAL FIELD

The present disclosure relates generally to software operators in distributed computing environments. More specifically, but not by way of limitation, this disclosure relates to removing a software operator from a distributed computing environment, such as a cloud computing environment or computing cluster.

BACKGROUND

Software resources such as applications and microservices can be deployed inside containers within a distributed computing environment. A container is a relatively isolated virtual environment that can be generated by leveraging resource isolation features (e.g., cgroups and namespaces) of the Linux kernel. Deploying software resources inside containers can help isolate the resources from one another and provide other benefits.

To help automate the deployment, scaling, and management of software resources inside containers, some distributed computing environments may include container orchestration platforms. Container orchestration platforms can help manage containers to reduce the workload on users. One example of a container orchestration platform is Kubernetes. Distributed computing environments running Kubernetes can be referred to as Kubernetes environments.

Kubernetes environments can include software operators ("operators") for automating various repeatable tasks, such as deployment, scaling, and backup of software resources. In the context of Kubernetes, an operator is a software extension that can manage an assigned software resource, such as a stateful application. Once deployed, operators can create, configure, and manage instances of their assigned software resources on behalf of a user in a declarative way. For example, an operator can monitor the state of an assigned software resource and perform a reconciliation operation if a current state of the assigned software resource does not match a target state, to force the current state to match the target state.

Operators can be deployed in a Kubernetes environment using an Operator Lifecycle Manager (OLM). The OLM can assist users in installing, updating, and managing the lifecycles of operators. The OLM has a user interface through which users can select operators to install and uninstall. The OLM can deploy the operators based on manifest files (e.g., YAML files) defining properties of the operators.

DETAILED DESCRIPTION

Figure 1:
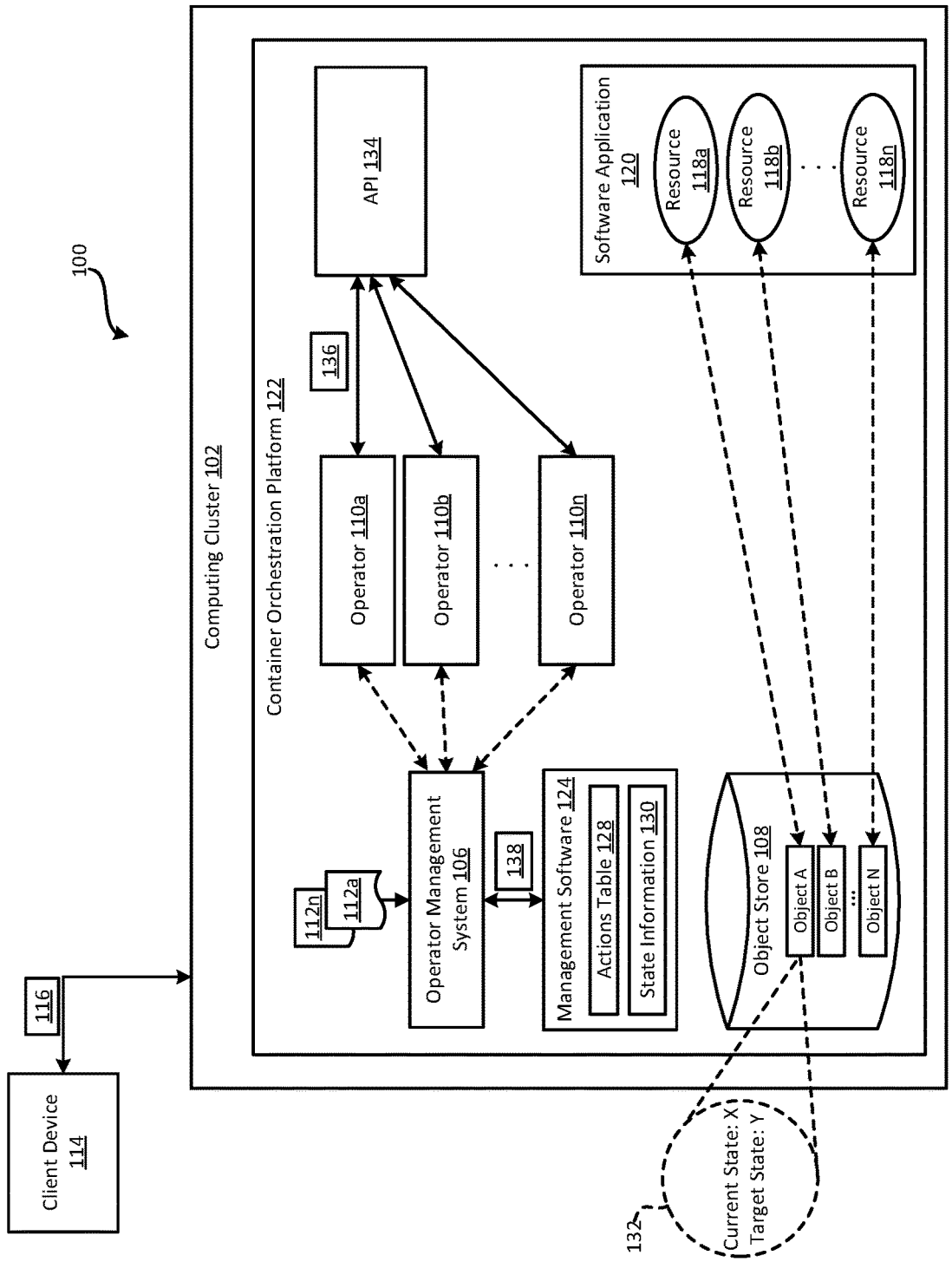
FIG. 1 shows a block diagram of an example of a system for removing software operators according to some aspects of the present disclosure.

A distributed computing environment can include an operator management system for adding, removing, and updating operators. One example of the operator management system can be the Operator Lifecycle Manager (OLM) in Kubernetes. In some cases, the operator management system may include an operator catalog that lists operators deployable in the distributed computing environment. Upon a user selecting an operator from the operator catalog, the operator management system can install (e.g., deploy and configure) the selected operator in the distributed computing environment. As part of the installation process, the operator may itself perform one or more actions after it is deployed in the distributed computing environment. The operator can perform the actions to allow the operator to properly function. Examples of such actions can include the creation, deletion, and modification of objects in the distributed computing environment. Objects are data structures that are distinct from and represent software resources in the distributed computing environment. For example, an object stored in a database can represent an individual microservice running in the distributed computing environment. The operator can monitor, update, and retrieve data from the object to perform various operations associated with the microservice in the distributed computing environment.

To uninstall an operator from a distributed computing environment, the operator management system may execute one or more actions defined in a preset uninstallation script, which may be manually drafted by a creator of the operator. But often times, these scripts are not sufficiently comprehensive and consequently objects that are no longer being used may be left behind, or left in an undesirable state, in the distributed computing environment. This may not only waste valuable computing resources (e.g., the memory space consumed by unused objects), but may also lead to security and performance problems if the unused objects are left in an insecure or outdated state.

Some examples of the present disclosure can overcome one or more of the abovementioned problems by providing management software that logs the actions performed by an operator in a distributed computing environment. Since some actions may depend on other actions, the management software can also log the particular order in which the actions are performed. The management software can then assist with the removal (e.g., uninstallation) of an operator from the distributed computing environment by determining an inverse of each action performed by the operator and performing the inverse actions in a reverse order. Examples of such inverse actions can include deleting an object that was added by the operator, recreating an object that was deleted by the operator, or reverting an object back to a prior state if the object was modified by the operator. In this way, the management software can assist in removing the operator, for example to help ensure that objects are not unintentionally left behind or left in an undesirable state.

One particular example can involve a computing cluster that is running Kubernetes as a container orchestration platform. Kubernetes can include an OLM for managing operators. A user can interact with the OLM to install a particular operator in a computing cluster. As part of the installation process, the OLM may deploy the operator in the computing cluster according to a predefined manifest file defining properties of the operator. Once the operator is running, the operator may then transmit a first command to an application-programming interface (API) of Kubernetes for causing a first object to be created in an object database. The operator may also transmit a second command to the API for causing a second object to be modified in the object database. The object database may be part of, and maintained by, Kubernetes. The management software can detect the first and second commands and log their corresponding actions in an actions table. The management software may also log the sequential order in which the first and second commands were issued in the actions table. In some examples, the management software may further store a snapshot of the current state of the second object (prior to the modification), which may allow the second object to be reverted to its current state during uninstallation of the operator.

At a later point in time, the user may interact with the OLM to uninstall the operator. In response to the user interaction, the OLM can execute a preset uninstallation script to remove the operator from the computing cluster. But in some cases, this uninstallation script may not be sufficiently comprehensive. As a result, the first object may unintentionally be left behind in the computing cluster or the second object may be unintentionally left in its modified state. This may waste storage space and lead to security or performance problems. To help avoid these issues, in some examples the OLM can transmit a command to the management software to initiate a supplementary uninstallation process. In response to receiving the command, the management software determine an inverse of each action that was performed by the operator, along with a sequential order in which each action was performed by the operator, based on the actions table. For example, the management software can determine that the inverse of the creation action is a deletion action for deleting the first object. And the management software can determine that the inverse of the modification action is a reversion action for reverting the second object back to its prior state (e.g., its state immediately before the modification occurred). The management software can then perform the inverse actions in a reverse order. Performing the inverse actions in the reverse order may be helpful if certain actions are dependent upon other actions. For example, the management software can first transmit a command to the API for causing the second object to be reverted to its prior state using the snapshot. The management software may then transmit another command to the API for causing the first object to be deleted from the object database. Using these techniques, the management software can assist the OLM in reverting the computing cluster back to its prior state before (e.g., immediately before) the operator was installed, resulting in a cleaner uninstallation of the operator.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing removal of software operators according to some aspects of the present disclosure. The system 100 includes a computing cluster 102 that may be formed from multiple nodes (e.g., servers or other computing devices) in communication with one another over one or more networks. The nodes may communicate with one another to collectively perform tasks in the computing cluster. For example, the nodes can communicate with one another to perform distributed data processing or other distributed projects in the computing cluster 102.

The computing cluster 102 includes a container orchestration platform 122 such as Kubernetes for assisting with managing (e.g., deploying and scaling) software resources inside containers within the computing cluster 102. To that end, the container orchestration platform 122 can include an object store 108 for storing objects, which can be data structures representing the software resources. The object store 108 can be a database or any other suitable storage means for storing objects. In the example shown in FIG. 1, the object store 108 includes objects A-N that correspond to software resources 118a-n, respectively. That is, each of the objects A-N represents an individual one of the software resources 118a-n. In some examples, the software resources 118a-n may collectively form a software application 120. For example, the software resources 118a-n can include microservices or serverless functions that collectively implement the overall functionality of the software application 120.

The container orchestration platform 122 also includes an operator management system 106, such as OLM in the context of Kubernetes. The operator management system 106 can provide a user interface to allow users to quickly and easily add (e.g., install) operators to, and remove (e.g., uninstall) operators from, the computing cluster 102. The container orchestration platform 122 can add the operators 110a-n to the computing cluster 102 based on manifest files defining the properties of the operators 110a-n. Each operator can have a corresponding manifest file, which the container orchestration platform 122 can receive and rely upon to deploy and configure the operator in the computing cluster 102. The container orchestration platform 122 can remove operators 110a-n from the computing cluster 102 based on uninstallation scripts 112a-n defining uninstallation operations. Each operator can have a corresponding, preset uninstallation script, which the container orchestration platform 122 can receive and execute to remove the operator in the computing cluster 102.

In some examples, a user may wish to add an operator 110a to the computing cluster 102. To do so, the user can operate a client device 114 to interact with the operator management system 106. Examples of the client device 114 can include a desktop computer, laptop computer, or mobile phone. The client device 114 may be internal or external to the computing cluster 102 and can communicate with the computing cluster 102 via one or more networks, such as the Internet. Based on the user interaction, the operator management system 106 can deploy the operator 110a in the computing cluster 102. This may involve the operator management system 106 transmitting one or more commands to an API 134 of the container orchestration platform 122 for causing the operator 110a to be deployed in the computing cluster 102.

Once the operator 110a is running in the computing cluster 102, the operator 110a may perform one or more actions. Examples of such actions can include adding an object (e.g., object N+1) to the object store 108, deleting an existing object (e.g., object N) from the object store, or modifying the content of an existing object in the object store 108. To perform said actions, in some examples the operator 110a can transmit corresponding commands 136 to the API 134 of the container orchestration platform 122.

In some examples, management software 124 can detect the actions initiated by the operator 110a. For example, the management software 124 can be configured as a proxy server, which may be conceptually positioned as an intermediary between the operator 110a and the API 134. The operator 110a can be configured to transmit commands 136 to the proxy server, which can intercept and analyze the commands 136 before passing the commands 136 on to the API 134. By analyzing the commands 136, the management software 124 can determine the actions initiated by the operator 110a. As another example, the operator 110a can output the commands 136 on a messaging bus, which can be monitored by the management software 124 to detect the commands 136. One example of software for implementing a messaging bus can be RabbitMQ™. By detecting and analyzing the commands 136 on the messaging bus, the management software 124 can determine the actions initiated by the operator 110a. Other ways of determining the actions initiated by the operator 110 are also possible.

Figure 2:
FIG. 2 shows an example of an actions table according to some aspects of the present disclosure.

The management software 124 can store the detected actions in an actions table 128. The actions table 128 can be a data table or any other suitable data structure. The management software 124 can also store information in the actions table 128 indicating the sequential order in which the actions were initiated by the operator 110a. One example of such an actions table 128 is shown in FIG. 2. As shown, the actions table 128 can include a series of entries. Each entry can correspond to an individual action initiated by an individual operator. Each entry can include an operator identifier that uniquely identifies the operator that initiated the action, an action identifier that uniquely identifies the action type (e.g., create, modify, or delete), an object identifier that uniquely identifies the target object associated with the action, and an order identifier indicating a position of the action in a sequential order relative to other actions in the actions table 128. In some examples, the operator identifier may be determined based on a header of a command 136 transmitted from the operator 110a, the action identifier may be determined based on a payload of the command 136, and the order identifier may be determined based on transmission time or receipt time of the command 136. Of course, other ways of determining this information are also possible. It will be appreciated that although the order identifier is a timestamp in this example, other examples may involve other types of order identifiers such as a sequential numbers. And other examples may have more, less, or different entry data than is shown in FIG. 2.

In some examples, the management software 124 may also store state information 130 associated with one or more existing objects in the object store 108. For example, the management software 124 can determine that one of the actions initiated by the operator 110a involves deleting an existing object A from the object store 108. To enable object A to be recreated upon uninstallation of the operator 110a, the management software 124 can determine and store the current state of object A as state information 130. In some examples, the management software 124 can determine the state information 130 by retrieving it from the object itself or from another source. For example, object A may include a current-state field and a target-state field, as shown in the dashed circle 132. The current-state field can include the state information 130 describing a current state of the object, which may serve as a proxy for the current state of the corresponding software resource 118a in the computing cluster 102. And the target-state field can include target-state information describing a desired state of the object, which may serve as a proxy for the desired state of the corresponding software resource 118a in the computing cluster 102. The current state may or may not be different from the target state. The management software 124 can retrieve the state information 130 by transmitting a command to the API 134, which can return the state information 130. The management software 124 can then store the state information 130, which can serve as a snapshot of the current state of the object A.

A similar process can be performed if one of the operator's actions involves modifying an existing object B in the object store 108. To allow the object B to be reverted to its current state (e.g., its state immediately prior to the modification) upon uninstallation of the operator 110a, the management software 124 can determine and store the current state of object B as part of the state information 130. The management software 124 can determine the current state of object B using any of the techniques described above.

At a later point in time, the user may decide to uninstall the operator 110a. To do so, the user can operate the client device 114 to transmit an uninstallation command 116 to the operator management system 106. In response to receiving the uninstallation command 116, the operator management system 106 can execute a preset uninstallation script 112a to remove the operator 110a from the computing cluster 102. But in some cases, the uninstallation script 112a may not be sufficiently comprehensive, which may lead to various problems. To help prevent the problems from arising, in some examples the operator management system 106 can transmit an uninstallation command 138 to the management software 124 to initiate an additional uninstallation process. The additional uninstallation process may be designed to supplement the uninstallation process performed by the operator management system 106.

Figure 3:
FIG. 3 shows examples of actions and their inverses according to some aspects of the present disclosure.

More specifically, the management software 124 can receive the uninstallation command 138 and, in response to receiving the uninstallation command 138, determine each action that was performed by the operator 110a. The management software 124 can determine each action that was performed by the operator 110a using the actions table 128. The management software 124 can then determine an inverse of each action that was performed by the operator 110a. The inverse of a given action is referred to herein as an "inverse action." In some examples, the management software 124 can determine the inverse actions by using preprogrammed relationships between actions and their inverse actions. The preprogrammed relationships can be stored in a database or can be stored as preprogrammed rules. One example of such preprogrammed relationships between actions and inverse actions is shown in the table 300 of FIG. 3. The management software 124 can use the preprogrammed relationships to determine which inverse action to perform to undo a particular action.

In some examples, the management software 124 can also determine a sequential order in which the actions were performed by the operator 110a. The sequential order can be the order in which the actions were performed relative to one another. The management software 124 can determine the sequential order based on the order identifiers in the actions table 128, for example by comparing the order identifiers (e.g., timestamps or sequential numbers) to one another. Alternatively, the management software 124 may skip this step if the sequential order of the actions does not matter.

The sequential order of the actions may not matter if, for example, the actions are not dependent on one another.

Having determined which inverse actions to perform, the management software 124 can proceed to perform the inverse actions. Performing an inverse action may involve transmitting a corresponding command to the API 134 of the container orchestration platform 122 for causing the container orchestration platform 122 to execute the inverse action on behalf of the management software 124. In some examples in which the order of the inverse actions is important, the management software 124 may perform the inverse actions in a reverse order. This may involve transmitting commands to the API 134 of the container orchestration platform 122 for causing the inverse actions to be performed in the reverse order. Through this process, the management software 124 can undo the actions performed by the operator 110*a*.

As noted above, the operator 110*a* may perform an action involving deleting an object from the computing cluster 102. For example, the action can involve deleting the object from the object store 108. So, the management software 124 can determine that a corresponding inverse action involves generating (e.g., re-deploying) the object in the computing cluster 102. For example, the inverse action can involve re-creating the object in the object store 108. To perform the inverse action, the management software 124 can use the stored state information 130 relating to the object. For example, the management software 124 can transmit a command that includes the state information 130 to the API 134 for causing the container orchestration platform 122 to re-create the object such that it has the state defined in the state information 130.

Additionally or alternatively, the operator 110*a* may perform an action involving modifying an object in the object store 108 from a first state to a second state. So, the management software 124 can determine that a corresponding inverse action involves reverting the object back to the first state. To perform the inverse action, the management software 124 can use the stored state information 130 relating to the object. For example, the management software 124 can transmit a command that includes the state information 130 to the API 134 for causing the container orchestration platform 122 to revert the object from its current state (e.g., the second state or another state) back to the first state.

To prevent duplication of work and possible errors, in some examples the management software 124 may only undo actions that were not already previously undone by the operator management system 106 during its uninstallation process. For example, the management software 124 can determine which operations were performed by the operator management system 106 during its uninstallation process. This may be achieved by communicating with the operator management system 106 or monitoring the operations performed by the operator management system 106. Based on the operations performed by the operator management system 106, the management software 124 may determine that a certain subset of the actions described in the actions table 128 were not undone by the operator management system 106. The management software 124 may then only perform the inverses of that limited subset of actions, to help "fill in the gaps" in the uninstallation process and avoid duplication of work. This may also prevent errors from arising, for example if the management software 124 attempts to undo an action that has already been previously undone by the operator management system 106.

While the example shown in FIG. 1 has a certain number and arrangement of components, these are merely illustrative. Other examples can include more components, fewer components, or a different arrangement of the components shown in FIG. 1. For instance, other examples can involve a multitude of client devices interacting with any suitable type of distributed computing environment to install hundreds or thousands of operators thereon, where the operators can perform any number of actions. Such actions can be monitored by the management software 124 for use in uninstalling the operators in accordance with the techniques described herein.

Figure 4:
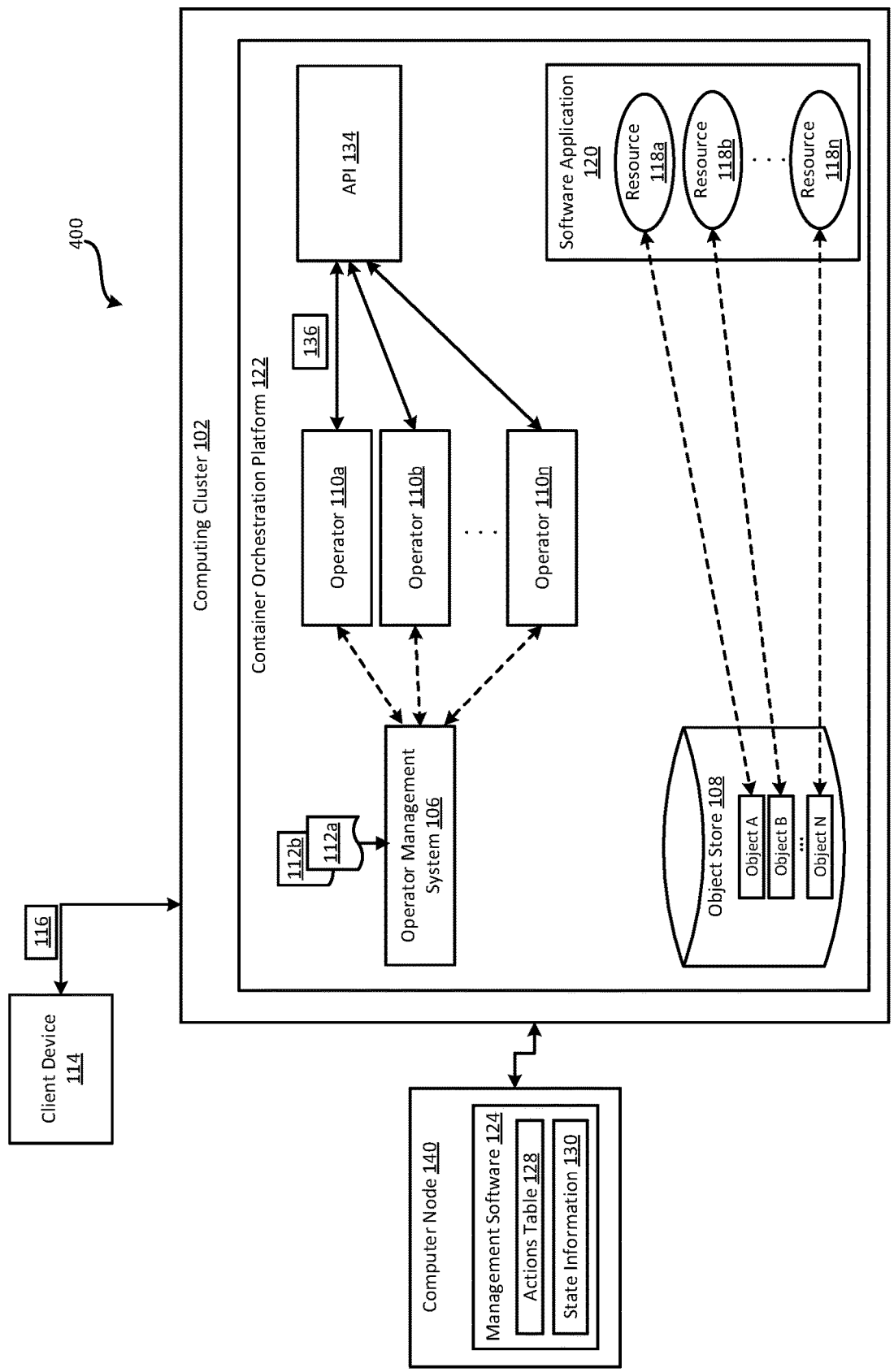
FIG. 4 shows a block diagram of another example of a system in which management software is external to a computing cluster according to some aspects of the present disclosure.

Another example of a system 400 for managing removal of software operators is shown in FIG. 4. In this example, the management software 124 is located on a computer node 140 (e.g., a laptop computer, desktop computer, or server) that is external to the computing cluster 102. The management software 124 can communicate with the computing cluster 102, such as the API 134 of the container orchestration platform 122, via one or more networks. An example of such a network can be the Internet. Other aspects of FIG. 4 are similar to those of FIG. 1.

Figure 5:
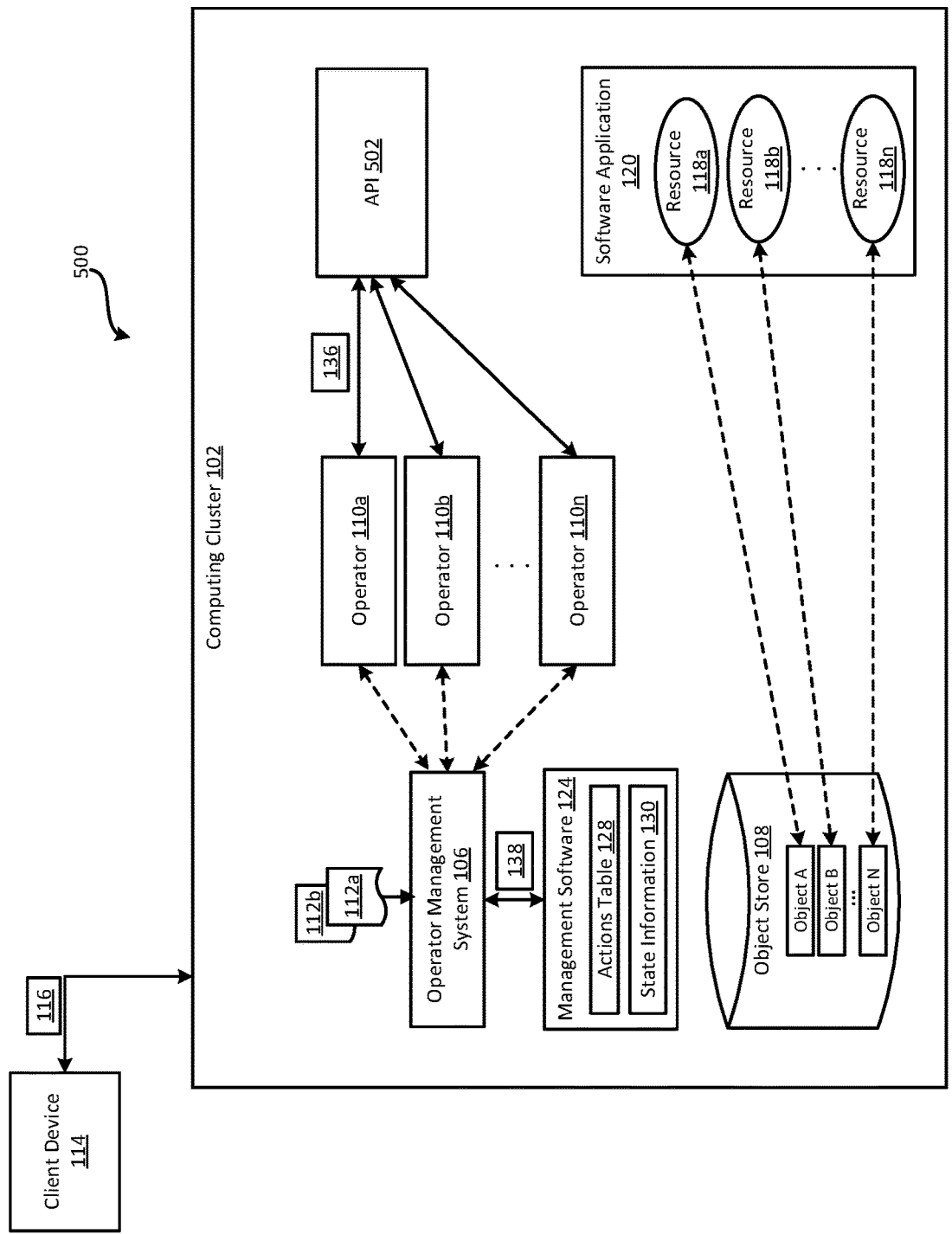
FIG. 5 shows a block diagram of yet another example of a system that excludes a container orchestration platform according to some aspects of the present disclosure.

Another example of a system 500 for managing removal of software operators is shown in FIG. 5. In this example, the computing cluster 102 excludes a container orchestration platform, such as the container orchestration platform 122 of FIG. 1. In some such examples, the system components may communicate with the API 502 of the computing cluster 102, rather than the API 134 of a container orchestration platform 122, to implement the abovementioned functionality. Other aspects of FIG. 5 are similar to those of FIG. 1.

Figure 6:
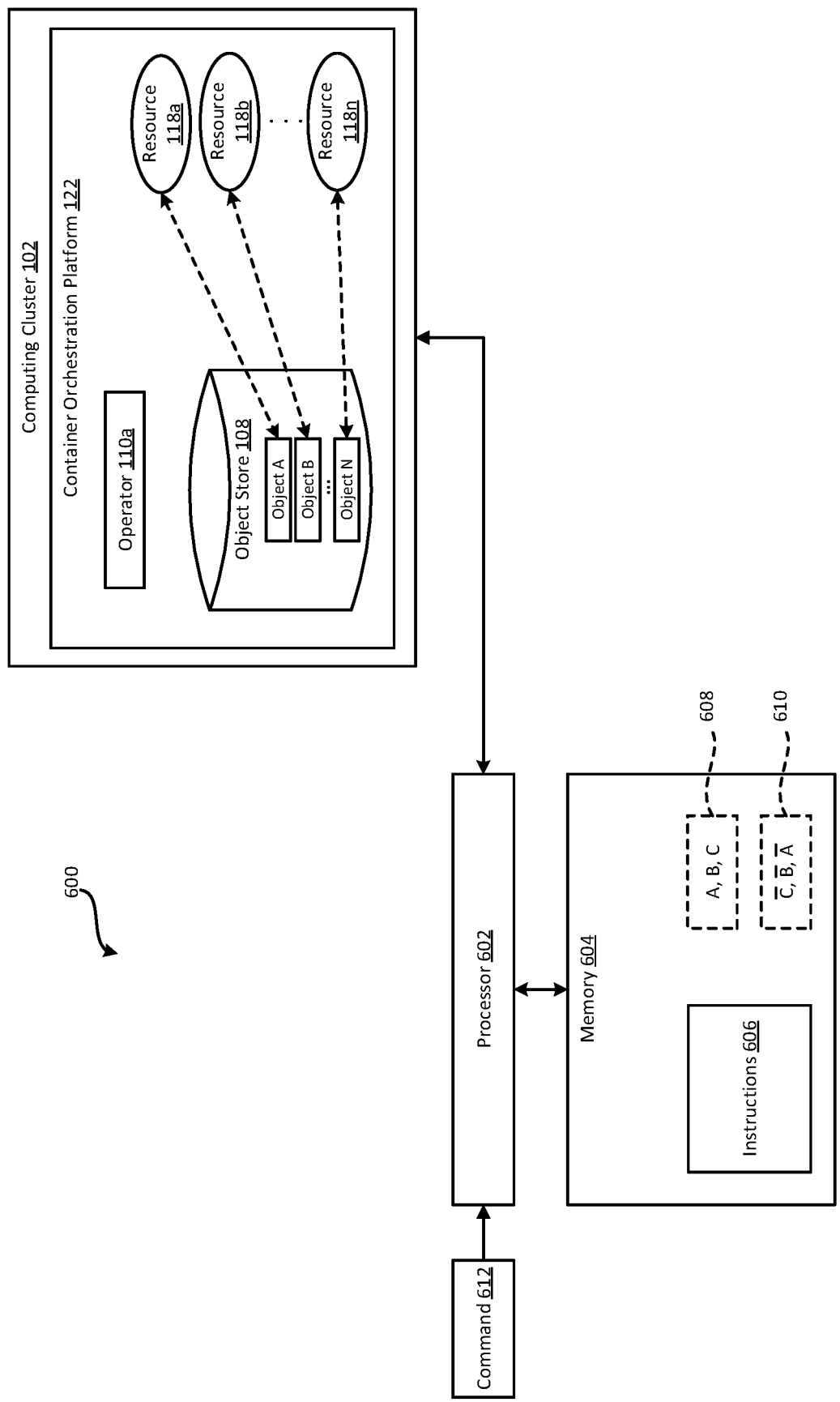
FIG. 6 shows a block diagram of another example of a system for managing removal of software operators according to some aspects of the present disclosure.

FIG. 6 shows a block diagram of another example of a system 600 for managing removal of software operators according to some aspects of the present disclosure. The system 600 includes a processor 602 communicatively coupled with a memory device 604. The processor 602 can include one processing device or multiple processing devices. Non-limiting examples of the processor 602 include a Field-Programmable Gate Array (FPGA), an application-specific integrated circuit (ASIC), a microprocessor, etc. The processor 602 can execute instructions 606 stored in the memory device 604 to perform operations. In some examples, the instructions 606 can include processor-specific instructions generated by a compiler or an interpreter from code written in any suitable computer-programming language, such as C, C++, C#, etc.

The memory device 604 can include one memory device or multiple memory devices. The memory device 604 can be non-volatile and may include any type of memory device that retains stored information when powered off. Non-limiting examples of the memory device 604 include electrically erasable and programmable read-only memory (EEPROM), flash memory, or any other type of non-volatile memory. In some examples, at least some of the memory device can include a computer-readable medium from which the processor 602 can read instructions 506. A computer-readable medium can include electronic, optical, magnetic, or other storage devices capable of providing the processor 602 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 606.

In some examples, the processor 602 can receive a command 612 to remove (e.g., uninstall) an operator 110*a* from a computing cluster 102. The operator 110*a* can be configured to manage one or more objects A-N that are distinct from and represent software resources 118a-n of the computing cluster 102. In response to receiving the command 612, the processor 602 can determine a plurality of actions that were previously performed in the computing cluster 102 in relation to adding (e.g., installing) the operator 110a to the computing cluster 102. For example, the processor 602 can determine that actions A-C were performed by accessing an actions table. Each action can involve a creation, modification, or deletion of an object in the computing cluster 102. The processor 602 can also determine a particular order 608 in which the plurality of actions were previously performed relative to one another. For example, the processor 602 can determine that actions A-C were performed in a particular order 608 by analyzing order identifiers corresponding to actions A-C in the actions table.

Next, the processor 602 can assist with removing the operator 110a from the computing cluster 102. For example, the processor 602 can assist with uninstalling the operator 110a from the container orchestration platform 122 by causing an inverse of each action in the plurality of actions to be performed. The inverses of actions A, B, and C are designated as $\overline{A}$, $\overline{B}$, and $\overline{C}$ in FIG. 6. The processor 602 can perform these inverse actions in a reverse order 610 to the particular order 608.

Figure 7:
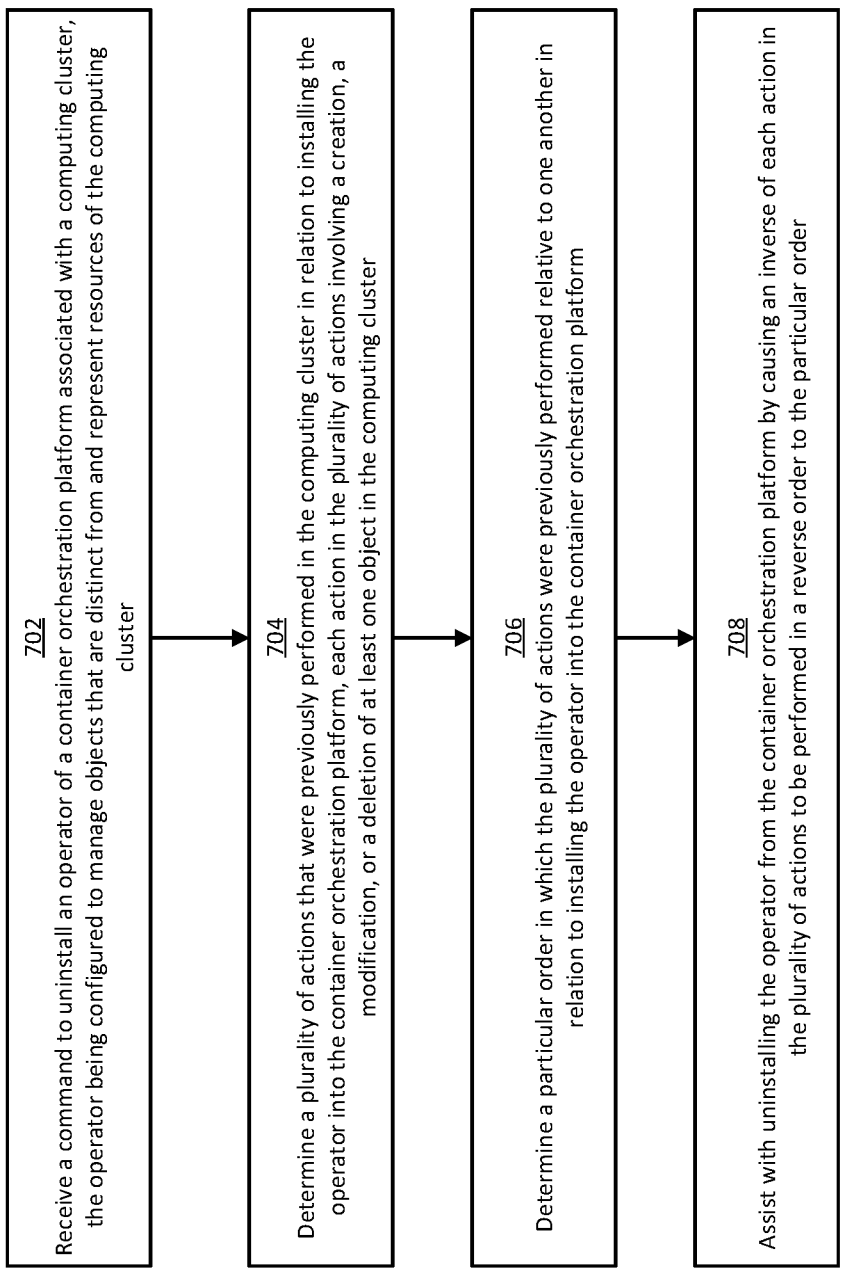
FIG. 7 shows a flow chart of an example of a process for removing software operators according to some aspects of the present disclosure.

In some examples, the processor 602 can implement some or all of the steps shown in FIG. 7. Other examples can include more steps, fewer steps, different steps, or a different combination of steps than are shown in FIG. 7. The steps of FIG. 7 are discussed below with reference to the components discussed above in relation to FIG. 6.

In block 702, the processor 602 receives a command 612 to uninstall an operator 110a of a container orchestration platform 122 associated with a computing cluster 102. In some examples, the command 612 may be similar to the uninstallation command 116 transmitted by the client device 114 in FIG. 1. Alternatively, the command 612 may be similar to the uninstallation command 138 transmitted by the operator management system 106 in FIG. 1.

In block 704, the processor 602 determines a plurality of actions that were previously performed in the computing cluster 102 in relation to installing the operator 110a in the container orchestration platform 122. For example, the processor 602 can determine that the Actions A-C shown in FIG. 6 were performed by the operator by accessing an actions table, such as the actions table 128 of FIG. 1.

In block 706, the processor 602 determines a particular order 608 in which the plurality of actions were performed relative to one another in relation to installing the operator 110a in the container orchestration platform 122. For example, the processor 602 can determine that Actions A-C were performed in the particular order 608 by analyzing their timestamps in the actions table.

In block 708, the processor 602 assists with uninstalling the operator 110a from the container orchestration platform 122 by causing an inverse of each action in the plurality of actions to be performed in a reverse order 610 to the particular order 608. For example, the processor 602 can determine that the inverse actions $\overline{A}$, $\overline{B}$, and $\overline{C}$ are inverses of the actions A, B, and C using preprogrammed relationships between actions and inverse actions. The processor 602 can then execute the inverse actions in a reverse order 610 to the particular order 608 (e.g., first $\overline{C}$, then $\overline{B}$, and finally $\overline{A}$).

In other examples where the actions are not dependent on one another, the order in which the inverse actions are performed may not matter. So in some such examples, the processor 602 may cause the inverse actions to be performed in any suitable order, which may be the same as or different from the reverse order 610.

In some aspects, software operators can be removed from a distributed computing environment in accordance with one or more of the following examples. As used below, any references to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to perform operations including: receiving a command to remove an operator from a computing cluster, the operator being configured to manage objects that are distinct from and represent software resources of the computing cluster; and in response to receiving the command: determining a plurality of actions previously performed in the computing cluster in relation to adding the operator to the computing cluster, each action in the plurality of actions involving a creation, a modification, or a deletion of at least one object in the computing cluster; determining a particular order in which the plurality of actions were previously performed relative to one another in relation to adding the operator in the computing cluster; and assisting with removing the operator from the computing cluster by causing an inverse of each action in the plurality of actions to be performed in the computing cluster in a reverse order to the particular order.

Example #2: The non-transitory computer-readable medium of Example #1, wherein the computing cluster is configured to maintain the objects in a database, and wherein the objects each include (i) a current-state field describing a current state of a corresponding software resource in the computing cluster and (ii) a target-state field describing a desired state of the corresponding software resource.

Example #3: The non-transitory computer-readable medium of any of Examples #1-2, wherein an action of the plurality of actions involves creating an object for use by the computing cluster, and further comprising program code that is executable by the processor for causing the processor to: determine that the inverse of the action involves deleting the object from the computing cluster; and cause the object to be deleted from the computing cluster.

Example #4: The non-transitory computer-readable medium of any of Examples #1-3, wherein an action of the plurality of actions involves deleting an object from the computing cluster, and further comprising program code that is executable by the processor for causing the processor to: determine that the inverse of the action involves recreating the object in the computing cluster; and cause the object to be recreated on the computing cluster using stored state information, the stored state information describing a state of the object prior to the object being deleted from the computing cluster.

Example #5: The non-transitory computer-readable medium of Example #4, further comprising program code that is executable by the processor for causing the processor to, prior to the object being deleted from the computing cluster: retrieve state information from a current-state field of the object, the state information describing a current state of the object; and store the state information in a storage device, the state information serving as the stored state information.

Example #6: The non-transitory computer-readable medium of any of Examples #1-5, wherein an action of the plurality of actions involves modifying an object of the computing cluster from a first state to a second state, and further comprising program code that is executable by the processor for causing the processor to: determine that the inverse of the action involves reverting the object back to the first state; and cause the object to be reverted back to the first state using stored state information describing the first state of the object.

Example #7: The non-transitory computer-readable medium of Example #6, further comprising program code that is executable by the processor for causing the processor to, prior to the object being modified from the first state to the second state: retrieve state information from a current-state field of the object, the state information describing the first state of the object; and store the state information in a storage device, the state information serving as the stored state information.

Example #8: The non-transitory computer-readable medium of any of Examples #1-7, wherein the operator is configured to execute the plurality of actions by transmitting a plurality of application-programming interface (API) commands to an API of the computing cluster.

Example #9: The non-transitory computer-readable medium of Example #8, further comprising program code that is executable by the processor for causing the processor to: generate a plurality of entries in a datastore by, for each API command of the plurality of API commands: determining an operator identifier based on the API command, the operator identifier being a unique identifier of the operator that transmitted the API command; determining an action identifier based on the API command, the action identifier indicating a type of action to be executed based on the API command; determine an order identifier for the API command, the order identifier indicating an order of the API command relative to the other API commands in the plurality of API commands; and creating an entry in the datastore that includes the operator identifier, the action identifier, and the order identifier; determine the particular order in which the plurality of actions were performed based on the order identifier in each entry of the plurality of entries; and determine the inverse of each action in the plurality of actions based on the action identifier described in each corresponding entry of the plurality of entries.

Example #10: The non-transitory computer-readable medium of any of Examples #1-9, further comprising program code that is executable by the processor for causing the processor to receive the command from an operator management system that is configured to assist users with installing and uninstalling operators in the computing cluster.

Example #11: The non-transitory computer-readable medium of Example #10, wherein the operator management system is configured to uninstall the operator from the computing cluster by executing an uninstallation process that is defined in a preset uninstallation script, and wherein the operations are distinct from the uninstallation process.

Example #12: The non-transitory computer-readable medium of Example #11, further comprising program code that is executable by the processor for causing the processor to: determine that the plurality of actions were not undone by the uninstallation process; and in response to determining that the plurality of actions were not undone by the uninstallation process, cause the inverse of each action in the plurality of actions to be performed in the computing cluster.

Example #13: The non-transitory computer-readable medium of any of Examples #1-12, wherein the software resources are part of, or are configured for use by, a software application of the computing cluster.

Example #14: A method comprising: receiving, by a processor, a command to uninstall an operator of a container orchestration platform associated with a computing cluster, the operator being configured to manage objects that are distinct from and represent software resources of the computing cluster; and in response to receiving the command, executing, by the processor, operations including: determining a plurality of actions that were previously performed in the computing cluster in relation to installing the operator into the container orchestration platform, each action in the plurality of actions involving a creation, a modification, or a deletion of at least one object in the computing cluster; determining a particular order in which the plurality of actions were previously performed relative to one another in relation to installing the operator into the container orchestration platform; and assisting with uninstalling the operator from the container orchestration platform by causing an inverse of each action in the plurality of actions to be performed in a reverse order to the particular order.

Example #15: The method of Example #14, wherein the objects are stored in an object store that is maintained by the container orchestration platform, and wherein the software resources are used by a software application of the computing cluster.

Example #16: The method of any of Examples #14-15, wherein an action of the plurality of actions involves deleting an object from the container orchestration platform, and wherein causing the inverse of the action to be performed involves recreating the object on the container orchestration platform using stored state information, the stored state information describing a state of the object prior to the object being deleted from the container orchestration platform.

Example #17: The method of any of Examples #14-16, wherein an action of the plurality of actions involves modifying an object of the container orchestration platform from a first state to a second state, and wherein causing the inverse of the action to be performed involves reverting the object back to the first state using stored state information.

Example #18: The method of any of Examples #14-17, wherein the operator is configured to execute the plurality of actions by transmitting a plurality of application-programming interface (API) commands to an API of the container orchestration platform, and further comprising: generating a plurality of entries in a datastore by, for each API command of the plurality of API commands: determining an operator identifier based on the API command, the operator identifier being a unique identifier of the operator that transmitted the API command; determining an action identifier based on the API command, the action identifier indicating a type of action to be executed based on the API command; determine an order identifier for the API command, the order identifier indicating an order of the API command relative to the other API commands in the plurality of API commands; and creating an entry in the datastore that includes the operator identifier, the action identifier, and the order identifier; determining the particular order in which the plurality of actions were performed based on the order identifier in each entry of the plurality of entries; and determining the inverse of each action in the plurality of actions based on the action identifier described in each corresponding entry of the plurality of entries.

Example #19: The method of any of Examples #14-18, further comprising receiving the command from an operator lifecycle manager (OLM) that is configured to assist users with installing and uninstalling operators from the container orchestration platform, wherein the OLM is configured to uninstall the operator from the container orchestration platform by executing an uninstallation process that is defined in a preset uninstallation script, and wherein the operations are distinct from the uninstallation process.

Example #20: A system comprising: a processor; and a memory including instructions that are executable by the processor for causing the processor to perform operations including: receiving a command to uninstall an operator of a container orchestration platform associated with a computing cluster, the operator being configured to manage objects that are distinct from and represent software resources of the computing cluster; and in response to receiving the command: determining a plurality of actions that were previously performed in the computing cluster in relation to installing the operator into the container orchestration platform, each action in the plurality of actions involving a creation, a modification, or a deletion of at least one object in the computing cluster; determining a particular order in which the plurality of actions were previously performed relative to one another in relation to installing the operator into the container orchestration platform; and assisting with uninstalling the operator from the container orchestration platform by causing an inverse of each action in the plurality of actions to be performed in a reverse order to the particular order.

Example #21: A system comprising: a computing cluster that includes a container orchestration platform for deploying and managing containerized applications in the computing cluster, the container orchestration platform including an operator lifecycle manager (OLM) for managing installation and uninstallation of operators in the container orchestration platform, wherein the OLM is configured to uninstall an operator from the container orchestration platform by executing a predefined uninstallation process; and a computer node that includes a processor and a memory, the memory including instructions that are executable by the processor for causing the processor to: receive a command from the OLM to uninstall the operator of the container orchestration platform; and in response to receiving the command, execute operations configured to assist in uninstalling the operator from the container orchestration platform, the operations being distinct from the predefined uninstallation process and including: determining a plurality of actions that were previously performed in the computing cluster in relation to installing the operator into the container orchestration platform, each action in the plurality of actions involving a creation, a modification, or a deletion of at least one object of the container orchestration platform; determining a particular order in which the plurality of actions were previously performed relative to one another in relation to installing the operator into the container orchestration platform; and causing an inverse of each action in the plurality of actions to be performed in a reverse order to the particular order.

Example #22: The system of Example #21, wherein the operator is configured to manage objects of the container orchestration platform, and wherein the objects represent software resources configured to be used by a software application of the computing cluster, the objects being separate from the software resources.

Example #23: The system of Example #22, wherein the container orchestration platform is configured to maintain the objects in a database.

Example #24: The system of any of Examples #21-23, wherein an action of the plurality of actions involves creating an object for use by the container orchestration platform, wherein the inverse of the action involves deleting the object from the container orchestration platform, and wherein the memory further includes instructions that are executable by the processor for causing the processor to cause the object to be deleted from the container orchestration platform.

Example #25: The system of any of Examples #21-24, wherein an action of the plurality of actions involves deleting an object from the container orchestration platform, wherein the inverse of the action involves recreating the object on the container orchestration platform, and wherein the memory further includes instructions that are executable by the processor for causing the processor to implement the inverse of the action by causing the object to be recreated on the container orchestration platform using stored state information, the stored state information describing a state of the object prior to the object being deleted from the container orchestration platform.

Example #26: The system of any of Examples #21-25, wherein an action of the plurality of actions involves modifying an object of the container orchestration platform from a first state to a second state, wherein the inverse of the action involves reverting the object from the second state back to the first state, and wherein the memory further includes instructions that are executable by the processor for causing the processor to implement the inverse of the action by causing the object to be reverted from the second state back to the first state using stored state information describing the first state of the object.

Example #27: The system of any of Examples #21-26, wherein the operator is configured to execute the plurality of actions by transmitting a plurality of application-programming interface (API) commands to an API of the container orchestration platform.

Example #28: The system of Example #27, wherein the memory further includes instructions that are executable by the processor for causing the processor to: generate a plurality of entries in a datastore by, for each API command of the plurality of API commands: determining an operator identifier based on the API command, the operator identifier being a unique identifier of the operator that transmitted the API command; determining an action identifier based on the API command, the action identifier indicating a type of action to be executed based on the API command; determine an order identifier for the API command, the order identifier indicating an order of the API command relative to the other API commands in the plurality of API commands; and creating an entry in the datastore that includes the operator identifier, the action identifier, and the order identifier; determine the particular order in which the plurality of actions were performed based on the order identifier in each entry of the plurality of entries; and determine the inverse of each action in the plurality of actions based on the action identifier described in each corresponding entry of the plurality of entries.

Example #29: The system of any of Examples #21-28, wherein the memory further includes instructions that are executable by the processor for causing the processor to: determine that the plurality of actions were not undone by the predefined uninstallation process; and in response to determining that the plurality of actions were not undone by the predefined uninstallation process, cause the inverse of each action in the plurality of actions to be performed.

Example #30: The system of any of Examples #21-29, wherein the computer node is external to the computing cluster.

Example #31: The system of any of Examples #21-30, wherein the memory further includes instructions that are executable by the processor for causing the processor to cause the inverse of each action in the plurality of actions to be performed in the reverse order by transmitting a plurality of application-programming interface (API) commands to an API of the container orchestration platform.

Example #32: A system comprising: means for receiving a command to uninstall an operator of a computing cluster, the operator being configured to manage objects that are distinct from and represent software resources of the computing cluster; and means for, in response to receiving the command: determining a plurality of actions previously performed in the computing cluster in relation to installing the operator, each action in the plurality of actions involving a creation, a modification, or a deletion of at least one object in the computing cluster; determining a particular order in which the plurality of actions were previously performed relative to one another in relation to installing the operator in the computing cluster; and causing an inverse of each action in the plurality of actions to be performed in the computing cluster in a reverse order to the particular order.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising program code that is executable by a processor for causing the processor to perform operations including:
   receiving a command to remove an operator from a computing cluster, the operator being configured to manage objects that are distinct from and represent software resources of the computing cluster; and
   in response to receiving the command:
      determining a plurality of actions previously performed in the computing cluster in relation to adding the operator to the computing cluster, each action in the plurality of actions involving a creation, a modification, or a deletion of at least one object in the computing cluster;
      determining a particular order in which the plurality of actions were previously performed relative to one another in relation to adding the operator in the computing cluster; and
      assisting with removing the operator from the computing cluster by causing an inverse of each action in the plurality of actions to be performed in the computing cluster in a reverse order to the particular order;
   wherein the computing cluster is configured to maintain the objects in a database, and wherein the objects each include (i) a current-state field describing a current state of a corresponding software resource in the computing cluster and (ii) a target-state field describing a desired state of the corresponding software resource.

2. The non-transitory computer-readable medium of claim 1, wherein an action of the plurality of actions involves creating an object for use by the computing cluster, and further comprising program code that is executable by the processor for causing the processor to:
   determine that the inverse of the action involves deleting the object from the computing cluster; and
   cause the object to be deleted from the computing cluster.

3. The non-transitory computer-readable medium of claim 1, wherein an action of the plurality of actions involves deleting an object from the computing cluster, and further comprising program code that is executable by the processor for causing the processor to:
   determine that the inverse of the action involves recreating the object in the computing cluster; and
   cause the object to be recreated on the computing cluster using stored state information, the stored state information describing a state of the object prior to the object being deleted from the computing cluster.

4. The non-transitory computer-readable medium of claim 3, further comprising program code that is executable by the processor for causing the processor to, prior to the object being deleted from the computing cluster:
   retrieve state information for the object; and
   store the state information in a storage device, the state information serving as the stored state information.

5. The non-transitory computer-readable medium of claim 1, wherein an action of the plurality of actions involves modifying an object of the computing cluster from a first state to a second state, and further comprising program code that is executable by the processor for causing the processor to:
   determine that the inverse of the action involves reverting the object back to the first state; and
   cause the object to be reverted back to the first state using stored state information describing the first state of the object.

6. The non-transitory computer-readable medium of claim 5, further comprising program code that is executable by the processor for causing the processor to, prior to the object being modified from the first state to the second state:
   retrieve state information for the object; and
   store the state information in a storage device, the state information serving as the stored state information.

7. The non-transitory computer-readable medium of claim 1, wherein the operator is configured to execute the plurality of actions by transmitting a plurality of application-programming interface (API) commands to an API of the computing cluster.

8. The non-transitory computer-readable medium of claim 7, further comprising program code that is executable by the processor for causing the processor to:
   generate a plurality of entries in a datastore by, for each API command of the plurality of API commands:
      determining an operator identifier based on the API command, the operator identifier being a unique identifier of the operator that transmitted the API command;
      determining an action identifier based on the API command, the action identifier indicating a type of action to be executed based on the API command;
      determine an order identifier for the API command, the order identifier indicating an order of the API command relative to the other API commands in the plurality of API commands; and
      creating an entry in the datastore that includes the operator identifier, the action identifier, and the order identifier;
   determine the particular order in which the plurality of actions were performed based on the order identifier in each entry of the plurality of entries; and
   determine the inverse of each action in the plurality of actions based on the action identifier described in each corresponding entry of the plurality of entries.

9. The non-transitory computer-readable medium of claim 1, further comprising program code that is executable by the processor for causing the processor to receive the command from an operator management system that is configured to assist users with installing and uninstalling operators in the computing cluster.

10. The non-transitory computer-readable medium of claim 9, wherein the operator management system is configured to uninstall the operator from the computing cluster by executing an uninstallation process that is defined in a preset uninstallation script, and wherein the operations are distinct from the uninstallation process.

11. The non-transitory computer-readable medium of claim 10, further comprising program code that is executable by the processor for causing the processor to:
determine that the plurality of actions were not undone by the uninstallation process; and
in response to determining that the plurality of actions were not undone by the uninstallation process, cause the inverse of each action in the plurality of actions to be performed in the computing cluster.

12. The non-transitory computer-readable medium of claim 1, wherein the software resources are part of, or are configured for use by, a software application of the computing cluster.

13. A method comprising:
receiving, by a processor, a command to uninstall an operator of a container orchestration platform associated with a computing cluster, the operator being configured to manage objects that are distinct from and represent software resources of the computing cluster; and
in response to receiving the command, executing, by the processor, operations including:
determining a plurality of actions that were previously performed in the computing cluster in relation to installing the operator into the container orchestration platform, each action in the plurality of actions involving a creation, a modification, or a deletion of at least one object in the computing cluster;
determining a particular order in which the plurality of actions were previously performed relative to one another in relation to installing the operator into the container orchestration platform; and
assisting with uninstalling the operator from the container orchestration platform by causing an inverse of each action in the plurality of actions to be performed in a reverse order to the particular order;
wherein the computing cluster is configured to maintain the objects in a database, and wherein the objects each include (i) a current-state field describing a current state of a corresponding software resource in the computing cluster and (ii) a target-state field describing a desired state of the corresponding software resource.

14. The method of claim 13, wherein the database is an object store that is maintained by the container orchestration platform, and wherein the software resources are used by a software application of the computing cluster.

15. The method of claim 13, wherein an action of the plurality of actions involves deleting an object from the container orchestration platform, and wherein causing the inverse of the action to be performed involves recreating the object on the container orchestration platform using stored state information, the stored state information describing a state of the object prior to the object being deleted from the container orchestration platform.

16. The method of claim 13, wherein an action of the plurality of actions involves modifying an object of the container orchestration platform from a first state to a second state, and wherein causing the inverse of the action to be performed involves reverting the object back to the first state using stored state information.

17. The method of claim 13, wherein the operator is configured to execute the plurality of actions by transmitting a plurality of application-programming interface (API) commands to an API of the container orchestration platform, and further comprising:
generating a plurality of entries in a datastore by, for each API command of the plurality of API commands:
determining an operator identifier based on the API command, the operator identifier being a unique identifier of the operator that transmitted the API command;
determining an action identifier based on the API command, the action identifier indicating a type of action to be executed based on the API command;
determine an order identifier for the API command, the order identifier indicating an order of the API command relative to the other API commands in the plurality of API commands; and
creating an entry in the datastore that includes the operator identifier, the action identifier, and the order identifier;
determining the particular order in which the plurality of actions were performed based on the order identifier in each entry of the plurality of entries; and
determining the inverse of each action in the plurality of actions based on the action identifier described in each corresponding entry of the plurality of entries.

18. The method of claim 13, further comprising receiving the command from an operator lifecycle manager (OLM) that is configured to assist users with installing and uninstalling operators from the container orchestration platform, wherein the OLM is configured to uninstall the operator from the container orchestration platform by executing an uninstallation process that is defined in a preset uninstallation script, and wherein the operations are distinct from the uninstallation process.

19. A system comprising:
a processor; and
a memory including instructions that are executable by the processor for causing the processor to perform operations including:
receiving a command to uninstall an operator of a container orchestration platform associated with a computing cluster, the operator being configured to manage objects that are distinct from and represent software resources of the computing cluster; and
in response to receiving the command:
determining a plurality of actions that were previously performed in the computing cluster in relation to installing the operator into the container orchestration platform, each action in the plurality of actions involving a creation, a modification, or a deletion of at least one object in the computing cluster;
determining a particular order in which the plurality of actions were previously performed relative to one another in relation to installing the operator into the container orchestration platform; and
assisting with uninstalling the operator from the container orchestration platform by causing an inverse of each action in the plurality of actions to be performed in a reverse order to the particular order;

wherein the computing cluster is configured to maintain the objects in a database, and wherein the objects each include (i) a current-state field describing a current state of a corresponding software resource in the computing cluster and (ii) a target-state field describing a desired state of the corresponding software resource.

* * * * *